United States Patent [19]

Morningstar et al.

[11] 4,269,954

[45] May 26, 1981

[54] PROCESS FOR PRODUCING HOMO- OR COPOLYMERS OF VINYL OR VINYLIDENE HALIDES HAVING REDUCED POLYMER BUILDUP IN THE REACTOR

[75] Inventors: Marion G. Morningstar; William D. Postel, Jr., both of Avon Lake, Ohio

[73] Assignee: The B. F. Goodrich Company, Akron, Ohio

[21] Appl. No.: 93,320

[22] Filed: Nov. 13, 1979

Related U.S. Application Data

[63] Continuation of Ser. No. 947,670, Oct. 2, 1978, abandoned.

[51] Int. Cl.$^3$ ............... C08F 2/00; C08F 14/06; C08F 14/08
[52] U.S. Cl. ...................... 526/62; 526/343; 526/344
[58] Field of Search .......................... 526/62

[56] References Cited

U.S. PATENT DOCUMENTS

| | | | |
|---|---|---|---|
| 3,669,946 | 6/1972 | Koyanagi et al. | 526/62 |
| 3,778,423 | 12/1973 | Reiter | 526/62 |
| 4,049,894 | 9/1977 | Backderf | 526/62 |

Primary Examiner—Harry Wong, Jr.
Attorney, Agent, or Firm—Roy P. Wymbs

[57] ABSTRACT

There is disclosed a process for preparing vinyl dispersion resins by conducting the polymerization reaction of the vinyl monomer or monomers in an aqueous medium using a low water solubility free radical yielding polymerization initiator or catalyst along with an inorganic or organic activator, using a fast reaction at the beginning of polymerization by employing a temperature below the desired temperature, then at the desired temperature and finally above the desired temperature, using an emulsifier system of an ammonium or an alkali metal salt of a high fatty acid containing from 8 to 20 carbon atoms, and/or a sulfate or sulfonate type soap, and at least one long straight chain alcohol containing from 12 to 24 carbon atoms, and conducting said polymerization in a reactor having a coating on the inner surfaces thereof comprising a polymerization inhibitor, the ingredients being thoroughly mixed prior to polymerization. Polymer buildup on the internal surfaces of the reactor is substantially reduced.

22 Claims, No Drawings

PROCESS FOR PRODUCING HOMO- OR COPOLYMERS OF VINYL OR VINYLIDENE HALIDES HAVING REDUCED POLYMER BUILDUP IN THE REACTOR

This is a continuation of application Ser. No. 947,670, filed Oct. 2, 1978, now abandoned.

BACKGROUND OF THE INVENTION

It is well known that vinyl resins may be plasticized or changed from the hard, horny and stiff state to a soft, plastic workable condition by the addition thereto at elevated temperatures of certain plasticizers, such as dioctyl phthalate, and the like. These vinyl polymers or resins are referred to as dispersion resins or paste resins and are usually made employing an emulsion polymerization technique, although in some instances, a suspension polymerization process can be used.

When the vinyl resin is mixed or blended with a plasticizer, it is referred to as a "plastisol". By virtue of the flowability of the plastisol it can be processed into various useful products. The plastisols can be used in making molded products, coatings, and the like. Accordingly, the dispersion or paste resin must be capable of being mixed with a plasticizer easily and uniformly to form low viscosity plastisols which are stable, containing particles of uniform and proper size, and capable of producing films, and like products of good clarity.

With the customary emulsion polymerization process, suitable latices have been difficult to obtain since the latices usually contain particles of varying size and are either too fine or too large.

Various proposals have been made to overcome these difficulties but not with the ultimate success desired. For example, the use of various different emulsifiers and catalysts have been proposed. Also, varying the conditions of polymerization has been suggested. However, in most of these cases, partially agglomerated particles have resulted which precipitate reducing the yield of desired polymer. Further, the shelf-life of such latices leave much to be desired. It is desirable to have latices which change very little during storage with respect to viscosity and have and maintain good heat stability.

In U.S. Pat. No. 4,076,920, issued Feb. 28, 1978, wherein a special emulsification system and polymerization conditions are employed, a very desirable dispersion resin is produced which overcomes most all of the problems spelled out above. However, there is another detrimental problem in the commercial production of polymers and copolymers of vinyl and vinylidene halides, when polymerized alone or with other vinylidene monomers having a terminal $CH_2=C<$ group, namely the formation of undesirable polymer buildup on the inner surfaces of the reactor. This deposit or buildup of polymer on the inner surfaces of the reactor not only interferes with heat transfer, but also decreases productivity and adversely affects polymer quality, such as producing fiber particles than desired with the resultant adverse effect on viscosity. Obviously this polymer buildup must be removed after each charge or cycle since more buildup occurs rapidly on that already present resulting in a hard, insoluble crust. It is desirable to be able to polymerize a plurality of charges before having to shut down for cleaning purposes. Prevention of the formation of the buildup would be the ideal. Therefore, there is a definite need in the art for a polymerization process which meets all of these criteria discussed above.

SUMMARY OF THE INVENTION

We have found that when a proper combination of polymerization conditions and ingredients are employed, latices can be produced which have all the necessary and desirable properties and with little or no polymer buildup. The process of the present invention comprises conducting the polymerization reaction of the vinyl monomer or monomers in an aqueous medium using a free radical yielding polymerization initiator or catalyst, having low water solubility along with an inorganic activator, such as sodium nitrite, using a fast reaction at the beginning of polymerization, employing a temperature below the desired temperature, then at the desired temperature and finally above the desired temperature, using an emulsifier system of an ammonium or alkali metal salt of a high fatty acid containing from 8 to 20 carbon atoms, and/or a sulfate or sulfonate type soap of $C_{12}$ to $C_{20}$ alkyl or aryl hydrocarbons, and at least one long straight chain alcohol containing from 12 to 24 carbon atoms, and conducting said polymerization in a reactor having a coating on the inner surfaces thereof comprising an inhibitor, such as self-condensed m-phenylenediamene, and wherein the ingredients are thoroughly mixed prior to polymerization. The dispersion or paste resins so produced have improved flow properties and heat stability and are capable of producing films having excellent clarity and improved water resistance. In addition, polymer buildup on the internal surfaces of the reactor is substantially reduced.

DETAILED DESCRIPTION

In the present invention, "vinyl dispersion resin" refers to polymers and copolymers of vinyl and vinylidene halides, such as vinyl chloride, vinylidene chloride and the like. The vinyl halides and vinylidene halides may be copolymerized with one or more vinylidene monomers having at least one terminal $CH_2=C<$ grouping. As examples of such vinylidene monomers may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives including $\alpha$-methyl styrene, vinyl toluene, chlorostyrene, and the like; vinyl naphthalene, allyl and vinyl chloroacetate, vinyl acetate, vinyl pyridene, methyl vinyl ketone, and other vinylidene monomers of the types known to those skilled in the art. The present invention is particularly applicable to the manufacture of vinyl dispersion or paste resins made by the polymerization of vinyl chloride or vinylidene chloride alone or in admixture with one or more vinylidene monomers copolymerizable therewith in amounts as great as about 80% by weight, based on the weight of the monomer mixture. The most preferred vinyl dispersion resin is polyvinyl chloride (PVC) and the invention, for the sake of simplicity and convenience, will be described in connection therewith, it being understood that this is merely intended in an illustrative sense and not limitative.

The present process for preparing vinyl dispersion resins is by means of the emulsion polymerization technique in an aqueous medium. However, in the instant invention it is necessary that certain specified materials are present in the polymerization medium and certain conditions of polymerization must be met in order to achieve the desired results. One of the important aspects of the invention is to have a fast polymerization rate at a low temperature in the first stage of the reaction in order to reduce or prevent the formation of paper buildup which normally occurs during this stage of the reaction. Paper buildup is to be avoided since it is the most difficult to remove. Further, sandy/chunky buildup forms on the paper buildup, thus the prevention of paper buildup is of primary importance.

The single most effective device for minimizing the formation of paper buildup is a vigorous or fast reaction, that is, an emulsion polymerization reaction which is complete in about 6 to about 14 hours, but preferably in about 8 to about 10 hours. Under normal circumstances, such a polymerization reaction is not complete until about 16 to 17 hours. The fast reaction is achieved by using a very energetic initiator system in combination with temperature ramping of the reaction mixture. Of course, there are other factors involved which will be discussed hereinafter. Normally, when making vinyl dispersion resins employing an emulsion polymerization technique a temperature in the range of about 30° C. to about 70° C. is used. This is the case when employing the usual catalyst systems. The temperature of reaction chosen will depend upon the intrinsic viscosity (IV), or molecular weight, desired in the finished product, since IV is a direct function of the reaction temperature. In the present invention, having chosen the proper fast reaction catalyst system, the reaction is started at a temperature below the temperature of reaction that normally would be employed to attain a vinyl dispersion resin having the desired IV. This is accomplished by keeping the reactor wall temperature as low as possible during the first stage of the reaction by rapidly passing low temperature cooling medium through the jacket of the reactor until a conversion of approximately 25% to 30% is reached. The reaction in the first stage, or at the beginning, should be so vigorous that the cooling capacity is taxed to the point that the circulating cooling medium in the jacket is as cold as possible. However, the reaction should not be so vigorous that the temperature cannot be controlled. This rigorous careful initiation and additional auxilliary cooling capacity, such as a reflux condenser mounted on the reactor, is highly desirable in the event the jacket capacity is insufficient to control the reaction temperature within the prescribed limits for the first stage. Thereafter, the cooling medium is adjusted, that is, the temperature and flow of the same, so as to raise the temperature of the reaction medium to that desired. This is allowed to continue for a predetermined length of time and then appropriate adjustments are made so as to raise the temperature of the reaction medium above that desired to finish out the reaction. All this is adjusted so as to maintain a substantially constant reaction rate throughout the cycle, and also, so that the average molecular weight or IV of the polymer produced is what it would be if all of the polymerization reaction were at the normal temperature. For example, using a fast reaction, i.e., about 8 to 10 hours, in combination with temperature ramping, one would polymerize for 3 hours at 45° C., 3 hours at 50° C. and 3 hours at 55° C.

In the process of the present invention, the same is conducted in the presence of a compound capable of initiating the polymerization. More importantly, not only must the initiator or catalyst be a free radical yielding initiator, but also be one capable of producing a fast reaction at low temperatures and have low water solubility. The useful initiators or catalysts for use in the invention include for example, bis(4-tert butyl cyclohexyl) peroxydicarbonate, di-cetyl peroxydicarbonate, bis(2-ethyl hexyl) peroxydicarbonate, di-lauroyl peroxide, and other peroxide or azo type initiators that have the necessary low water solubility and decomposition kinetics, which initiators will be apparent to those skilled in the art. The initiator or catalyst should have a water solubility less than about 500 mg./liter and preferably less than about 100 mg./liter. When employed in the polymerization recipe, the initiator is used in the range of about 0.02% to about 0.20% by weight, based upon the weight of the monomer or monomers being polymerized. Normally a catalyst range of 0.04% to 0.08% by weight is preferred.

In order to illustrate the water solubility of certain initiators, data for several are given in the following table:

TABLE I

| Solubility of Peroxides In Water | | |
|---|---|---|
| | INITIATOR | Solubility (mg./liter) |
| 1. | Di lauroyl peroxide | 10 |
| 2. | Bis(4tert butyl cyclohexyl) peroxydicarbonate | 25 |
| 3. | Di-cetyl peroxy dicarbonate | 350 |
| 4. | Bis(2-ethyl hexyl)peroxydicarbonate | 400 |
| 5. | Tert-butyl peroxypivalate | 1600 |

Number 5 in Table I is the initiator normally used in present emulsion polymerization recipes and it is noted that the water solubility is high. Such an initiator or catalyst is normally not suitable for achieving the results desired in the present invention.

In addition to the initiator or catalyst, it is preferred to use an activator for the catalyst in conjunction therewith, such as, for example, sodium nitrite. The initiators that are activated by $NaNO_2$, and like compounds, are those that are the least water-soluble. It is believed that if the initiator has high water solubility, it is inhibited by the water-soluble $NaNO_2$ whereas if the initiator has very low water solubility, $NaNO_2$ acts as an activator. Nevertheless, $NaNO_2$ gives cleaner reactors with peroxide catalysts, not because it is a water phase inhibitor, but because it results in faster reactions. An important feature of the peroxide/$NaNO_2$ initiation system is that the reaction rate starts out extremely fast and decreases slowly with time. Suitable activators, other than $NaNO_2$, useful in the practice of the present invention are sodium borohydride, hydroxyl ammonium sulfate, 2,4-dinitrobenzene sulfonate sodium salt, sodium sulfite, sodium bisulfite, sodium formaldehyde sulfoxylate, and other similar water-soluble reducing agents, etc. The activators are usually employed in an amount in the range of about 0.0005% to about 0.02% by weight based on the weight of the monomer or monomers being polymerized. It is preferred, however, to employ an amount of activator in the range of 0.001% to 0.01% by weight.

The initiator or catalyst is charged completely at the outset of the polymerization. The initiator is charged at the outset by adding it to the monomer premix with the other ingredients of the reaction mixture. This is particularly true when said premix is homogenized prior to introduction into the reactor. Homogenization of the monomer premix is the preferred method of obtaining the desired mixing above referred to herein. However, when adding the initiator to the monomer premix and then homogenizing, it is necessary that the temperature during the premixing and homogenization steps be kept below the minimum temperature of reactivity of the particular initiator or initiators being employed. Upon introduction of the homogenized mixture or premix into the reactor, the temperature is then raised to that at which the first phase of the reaction is to take place. This is the low temperature phase referred to above, which is below the desired temperature of reaction. In the first phase of the reaction the temperature of the reaction mixture or medium will be in the range of about 30° C. to about 50° C. In the second phase the temperature will be in the range of about 35° C. to about 60° C. and in the last phase in the range of about 40° C. to about 70° C. Of course, the particular temperature chosen in each phase of the polymerization reaction will depend upon the monomer or monomers being polymerized and the particular initiator system being used in conjunction therewith.

When using the emulsion polymerization technique in an aqueous medium, it is necessary to employ the proper emulsifier system. In the present invention it is preferred to employ the ammonium salt of a long chain saturated fatty acid, although the alkali metal salts of said fatty acids may also be used. Further, a sulfate or sulfonate type soap may be employed in combination with said ammonium salt of a long chain saturated fatty acid or employed in place of said ammonium salt, or alkali metal salts.

The saturated fatty acids useful in the present invention may be either natural or synthetic and should contain from 8 to 20 carbon atoms. As examples of such acids there may be named lauric, myristic, palmitic, marganic, stearic, and the like, beef tallow, coconut oil, and the like. The sulfate or sulfonate type soaps useful in the present invention are those having the general formula:

wherein n is an interger from 7 to 18, X is selected from

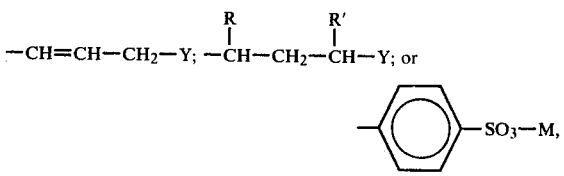

wherein R is H, OH, or an alkyl group having from 1 to 4 carbon atoms; R' is H or an alkyl group having from 1 to 4 carbon atoms; Y is —$SO_3$—M; —O—$SO_3$—M; or —O$CH_2CH_2$—O$)_m SO_3$—M, wherein M is selected from $NH_4$, Na, and K, and m is an integer from 7 to 17. As examples of soaps having the above formula there may be named sodium lauryl sulfate, sodium lauryl ether sulfate, sodium dodecylbenzene sulfonate, sodium alkyl sulfonates, sodium hydroxy sulfonates, sodium alkenyl sulfonates, as well as the ammonium and potassium salts, and the like.

The emulsifier or emulsifier system is employed in an amount in the range of about 0.5% to about 4% by weight, based on the weight of the monomer or monomers being polymerized. However, it is preferred to use a total amount of emulsifier in the range of about 1.0% to about 3.0% by weight. It is understood, of course, that mixtures of the various emulsifiers may be employed in making the emulsifier system, such as mixtures of the ammonium salts and/or alkali metal salts of the fatty acids, and the like.

In addition to the emulsifier(s), a long straight chain saturated alcohol containing from 12 to 24 carbon atoms is employed in combination therewith. This combination constitutes the emulsifier system of the present invention. Examples of the alcohols described above are tetradecanol, pentadecanol, hexadecanol, heptadecanol, octadecanol, nonadecanol, eicosanol, heneicosanol, docosanol, tricosanol, and tetracosanol. Mixtures of the alcohols can be employed. For example, a 12 carbon alcohol and an 18 carbon alcohol. Also, lower carbon content alcohols can be employed when mixed with the longer chain alcohols. For example, a mixture of dodecanol and octadecanol.

The ammonium salt of the long chain fatty acid can be made by mixing the fatty acid and ammonium hydroxide, separating the salt and adding to the polymerization medium in the usual fashion. However, it is preferred to form the ammonium salt in situ, that is, the fatty acid and ammonium hydroxide are added separately to the polymerization mixture or medium wherein they react to form the salt. An excess of ammonium hydroxide over the equimolar amount with the fatty acid should be employed. Similarly, when making the sodium salts, an excess of NaOH is used. This excess helps to maintain the reaction medium on the alkaline side which is important, as discussed below.

While a ratio of alcohol(s) to emulsifier(s) of 1.0 can be used, the best results are obtained when said ratio is greater than 1.0.

In the practice of the present invention, it is important that the polymerization reaction be conducted at a high pH. The polymerization process can be conducted at a pH in the range of about 7.0 to about 12.0. However, it is preferred, in order to reduce the polymer buildup, to operate in a pH range of about 9.0 to about 11.0. If the pH is too high it takes too much $NH_4OH$ and if the pH is too low, for example, below 9.0, the polymer buildup in the reactor increases. The amount of $NH_4OH$, or other alkali metal hydroxide, needed to properly adjust the pH will depend in part on the particular emulsifier system being used in the reaction mixture.

Another factor which contributes to the substantial elimination of buildup in the polymerization reactor is the presence of a coating on the inner surfaces of the reactor, which coating comprises a water phase polymerization inhibitor. All of the factors discussed provide a synergistic effect in substantially eliminating buildup.

The coating materials useful in the present invention are, among others, self-condensed m-phenylenediamine, etc., polyaromatic amines as described in U.S. Pat. Nos. 4,024,301 and 4,024,330, self-condensed polyhydric phenols as described in U.S. Pat. No. 4,080,173, water soluble dyes, such as described in U.S. Ser. No. 807,958, filed June 20, 1977, alkali metal hydroxide soluble dyes as described in U.S. Pat. No. 4,068,059, etc. The coating solutions are made by conventional methods using heat and agitation where necessary. Usually a temperature in the range of about 0° C. to about 100° C. is satisfactory. Agitation during dissolution is desirable. Usually a concentration of the coating ingredient in the coating solution in the range of about 0.05% to about 3.0% by weight is satisfactory. A preferred concentration range is from 0.2% to 1.0% by weight of the coating ingredient in the solution. At these concentrations, the coating solutions may be easily sprayed on the inner surfaces of the reactor through spray nozzles mounted thereon. Further, the molecular weight of the coating ingredient has an effect on the concentration of the same in the coating solution or the total solids content of said solution. The total solids content of the coating ingredient in the coating solutions useful in the present invention will be in the range of about 0.05% to about 3.0% by weight. However, since the molecular weight of the coating ingredient affects the total solids content in the coating solution, the total solids content could, in certain instances, be greater than 3.0% or less than 0.10% by weight.

In addition to spraying, it is also possible to apply the coating solution by flooding the reactor and then draining, or painting or brushing on, but spraying is the most practical and economical method of application. After application of the coating solution to the inner surfaces, the polymerization reaction can be started immediately. However, excellent results are obtained when after applying the coating solution to the inner surfaces of the reactor, the coated surfaces are sprayed with water and the reactor drained prior to charging the reactor with the polymerization mixture or recipe. It should be pointed out that the coatings above referred to can be applied equally well to glass or metal surfaces, such as stainless steel, and the like.

After the application of the coating, and spraying with water when elected, the polymerization reaction may be commenced immediately, no particular modification of processing techniques being required due to the presence of the coating. Further, using the internally coated reaction vessel does not adversely affect the heat stability or other physical and chemical properties of the polymers produced therein.

Another factor which presents a problem is in the upper parts, or dome, of the polymerizer which can result from foaming, which is not uncommon when using the emulsion polymerization system. When foaming does occur there are a number of ways of solving the problem. We have found it expedient to employ a reflux condenser on the top of the reactor. The condenser serves a twofold purpose. The condensed monomer(s), returning to the reactor in a liquid form, tend to break up the foam. In addition, the cooled returning monomer(s) assists in regulating the temperature in the reactor. This is particularly true when employing large reactors in a commercial plant where heat transfer presents a greater problem than that in development size reactors.

Upon completion of the polymerization reaction of the present invention, the vinyl dispersion resin is isolated in powder form from the latex by means of spray drying. That is, a fine spray of the polymer latex is injected into a heated air chamber thereby removing the water and recovering the dried resin in powder form. Other methods of recovering the vinyl dispersion resin may be employed, such as filtering for example. However, spray drying is the most effective way of recovering the polymer(s).

When the vinyl dispersion resin has been dried, it is used to make plastisols for the purpose of evaluating the resin properties. Plastisols are made with the dispersion resins of the instant invention by uniformly blending or intimately mixing, by conventional means, 100 parts by weight of the dispersion resin in powder form with from about 30 to about 100 parts by weight of one or more plasticizers. The useful plasticizers may be described as the alkyl and alkoxy alkyl esters of dicarboxylic acids or the esters of a polyhydric alcohol and a monobasic acid. As examples of such materials, there may be named dibutyl phthalate, dioctyl phthalate, dibutyl sebacate, dinonyl phthalate, di(2-ethyl hexyl)phthalate, di(2-ethyl hexyl) adipate, dilauryl phthalate, dimethyl tetrachlorophthalate, butyl phthalate, butyl glycollate, glyceryl stearate, and the like. The preferred plasticizers are the liquid diesters of aliphatic alcohols having from 4 to 20 carbon atoms and dibasic carboxylic acids having from 6 to 14 carbon atoms.

The plastisols made from the dispersion resins of the instant invention should have the desired yield with little or no dilatency. Yield is simply defined as resistance to flow and is normally determined numerically through viscosity measurements employing well known standard techniques. Normally, such values are arrived at by calculation from viscosity measurements using a Brookfiled Model RVF Viscometer according to ASTM method D1824-61T. Yield is determined from viscosity measurements of the plastisols at varying r.p.m.'s (revolutions per minute) after initial preparation and at intervals of aging. The viscosity is measured in centipoises (cps.) at a temperature of 23° C.

In order to rate the various coatings, as particularly set forth in the specific examples which follow hereinafter, a rating scale was devised with respect to paper and sandy buildup. The control in all cases of the emulsion polymerizations of the present invention was an uncoated reactor. Buildup, formed after emulsion polymerization, is rated on a scale of 0 to 5 where 0 is perfectly clean and 5 is heavily coated with paper and sand, for example, 1/16" thick. Evaluation of the type and extent of buildup is determined by making visual observations. Pictures were taken of the surfaces of the reactor after each experiment but in most cases, visual observation was more definitive than the pictures.

In order to further illustrate the present invention, the following specific examples are given. It is to be understood, however, that this is merely intended in an illustrative and not limitative sense. In the examples, all parts and percents are by weight unless otherwise indicated.

EXAMPLE I

In this example a control run was made using an uncoated reactor. The following recipe was polymerized:

| Ingredient | Parts |
|---|---|
| Vinyl chloride | 100.0 |
| Water (demineralized) | 125.0 |
| Alcohols - $C_{12}$ + $C_{18}$[1] | 2.1 |
| Lauric acid | 2.0 |
| Ammonium hydroxide (28%) | 0.244 |
| Sodium nitrite | 0.004 |
| Bis(4-tert butyl cyclohexyl) | |

| Ingredient | Parts |
| --- | --- |
| peroxydicarbonate | 0.080 |

[1]Straight chain alcohols

The above ingredients were put in an evacuated pressure vessel, or premix tank, and mixed briefly to form a premix. The premix was then pumped through a mechanical homogenizer into the polymerization reactor. The homogenizer was a "William G. Schroeder Nechfolger G.m.b.H. lab model 100/135." The homogenizer was set at 700 psi. in the first stage and at 1300 psi. in the second stage. The polymerization reactor was a 30 gal. stainless steel vessel equipped with a heating and cooling jacket, agitator, and baffles. The temperature in the reactor was raised to 40° C. and held there for 3 hours, then the temperature was raised to 45° C. and held there for 3 hours, and finally raised to 50° C. to finish the reaction. It took a total of 10 hours to complete the reaction, from the start at 40° C. The reactor was then emptied in the usual manner and the internal surfaces were washed down with a stream of water. Thereafter, the amount of buildup was rated by inspection using the rating scale described above. The results are shown in Example II.

EXAMPLE II

In this example the recipe and procedure of Example I were repeated with the exception that the interior surfaces of the polymerization reactor were previously coated with a 1% methanol solution of self-condensed m-phenylenediamine. After the reactor was emptied and washed down with a stream of water, the amount of polymer buildup was rated by inspection. The results, including Example I for comparison, were as follows:

| Run No. | Rating | Remarks |
| --- | --- | --- |
| EX. I | 2.0 | Good |
| EX. II | 0.7 | Quite clean |

These results clearly show the beneficial effect of employing a coated reactor in the emulsion polymerization process.

EXAMPLE III

In this example the recipe and procedure of Example I was employed using a 15 gal. reactor. A stainless steel plaque measuring $2\frac{1}{2}'' \times 1\frac{1}{2}'' \times \frac{1}{4}''$ was weighed and mounted in the reactor in such a way as to be in contact with the polymerization medium. One half of the plaque was previously coated with a 1% methanol solution of self-condensed m-phenylenediamine. The other half of the plaque was untreated. After the polymerization was complete, the plaque was removed and dried. The plaque was examined and weighed. The coated half was essentially free of polymer buildup, while the uncoated half had a distinct layer or coating of polymer buildup thereon. The total weight gain of the plaque, due to the polymer buildup, was 0.6 gram of which at least ⅝ was on the uncoated half.

EXAMPLE IV

In this example, two runs were made to show the effect of using an initiator or catalyst having low water solubility. The recipes employed in the runs were as follow:

| Ingredient | Parts EX.IV-1 | EX.IV-2 |
| --- | --- | --- |
| Vinyl chloride | 100 | 100 |
| Water (demineralized | 125 | 125 |
| Alcohols $C_{12} + C_{18}$[1] | 2.1 | 2.1 |
| Lauric acid | 2.0 | 2.0 |
| Ammonium hydroxide (28%) | 0.244 | 0.244 |
| Tert butyl peroxypivolate | 0.05 | — |
| Bis (4-tert butyl cyclohexyl) peroxydicarbonate | — | 0.06 |

[1]Straight chain alcohols

The above ingredients were put in an evacuated pressure vessel, or premix tank, and mixed briefly to form a premix. The premix was then pumped through a homogenizer (as described in Example I), with the first stage set at 700 psi. and the second stage set at 1300 psi., into a 15 gal. stainless steel polymerization reactor equipped with a heating and cooling jacket and an agitator. Immersed in the polymerizing medium was a $2\frac{1}{2}'' \times 1\frac{1}{2}'' \times \frac{1}{4}''$ stainless steel plaque which was weighed before and after polymerization to give a quantitative measure of polymer buildup. After the reactor was emptied and opened, it was rinsed with water and inspected for buildup. The plaque was removed, dried and weighed. The polymer buildup results were as follows:

| RUN NO. | REACTION TIME HOURS | REACTOR BUILDUP | PLAQUE WEIGHT GAIN-GRAMS | |
| --- | --- | --- | --- | --- |
| | | | TOTAL | PAPER |
| EX.IV-1 | 13.3 | Completely coated paper and fuzzy. | 0.58 | 0.02 |
| EV.IV-2 | 12.7 | Medium paper-light sandy. | 0.31 | 0.019 |

These results show that the use of a low water solubility initiator does reduce the polymer buildup in the emulsion polymerization process.

EXAMPLE V

In this example the recipe for run EX.IV-2 was used except that 0.004 part of sodium nitrite was added thereto to show the effect of the inorganic activator. The procedure of Example IV was followed and the run was designated EX.V-1. The results were as follows:

| RUN NO. | REACTION TIME HOURS | REACTOR BUILDUP | PLAQUE WEIGHT GAIN-GRAMS | |
| --- | --- | --- | --- | --- |
| | | | TOTAL | PAPER |
| EX.IV-2 | 12.7 | Medium paper-light sandy. | 0.31 | 0.019 |
| EX.V-1 | 9.7 | Very clean | 0.11 | 0.001 |

These results show that the inorganic activator contributes to the reduction in buildup.

Another run was made using the recipe of EX.IV-1 except that 0.008 part of sodium borohydride was added thereto. The procedure of Example IV was again followed and the run was designated EX.V-2. The results were as follows:

| RUN NO. | REACTION TIME-HOURS | REACTOR BUILDUP |
|---|---|---|
| EX.IV-1 | 13.3 | Completely coated-paper and fuzzy. |
| EX.V-2 | 12.5 | Very clean-much better. |

EXAMPLE VI

In this example a control run was made using an uncoated reactor. The following recipe was polymerized:

| INGREDIENT | PARTS |
|---|---|
| Vinyl chloride | 100 |
| Water(demineralized) | 125 |
| Alcohols-$C_{12}$ + $C_{18}$[1] | 2.1 |
| Lauric acid | 2.0 |
| Ammonium hydroxide (28%) | 0.244 |
| Sodium nitrite | 0.002 |
| Bis(4-tert butyl cyclohexyl) peroxydicarbonate | 0.080 |

[1] Straight chain alcohols.

The above ingredients were put in an evacuated pressure vessel, or premix tank, and mixed briefly to form a monomer premix. The premix was then pumped through a mechanical homogenizer (such as described in Example I) into the polymerization reactor, which was a 30 gal. stainless steel vessel equipped with a heating and cooling jacket, agitator, and baffles. The homogenizer was set at 700 psi. in the first stage and at 1300 psi. in the second stage. The temperature in the reactor was raised to 45° C. and held there until the pressure dropped to 50 psi. A total of 11 hours was required to finish the reaction. The reactor was then emptied in the usual manner and the internal surfaces were washed down with a stream of water. Thereafter, the amount of polymeric buildup was rated by inspection using the rating scale hereinbefore described. This run was designated as VI-1. A second run was made identical to VI-1 except that the temperature of the reaction was ramped or programmed as follows:

40° C. for the first 3 hours,
45° C. from 3 hours to 6 hours,
50° C. from 6 hours to 10 hours (end of reaction). This run was designated as VI-2 and the results of the polymeric buildup were as follows:

| RUN NO. | RATING | REMARKS |
|---|---|---|
| VI-1 | 2.8 | Completely coated with paper and fuzzy. |
| VI-2 | 1.9 | Light paper with trace of sand. |

These results show that temperature ramping, with the proper recipe, contributes to the reduction of polymeric buildup.

EXAMPLE VII

A series of 6 runs were made which show that reduction in polymer buildup is pronounced when the various elements of the present invention, illustrated in the previous examples, are combined. The internal surfaces of a 30 gal. stainless steel polymerization reactor, as described in Example I, were coated with a 0.5% solution of Nigrosine SSB2 (made and sold by American Cyanamide Co.) in methanol and then dried by blowing air through the reactor. The same recipe as in Example I was used and the procedure of Example I was followed. The temperature ramping was from 40° C. to 45° C. to 50° C. The polymerization reaction was continued until the pressure dropped to 50 psi. The reactor was then emptied in the usual manner and opened, after which the reactor surfaces were washed down with water and the level of polymer buildup determined by inspection. After wiping off the loose polymer or resin on the walls, the inner surfaces were recoated with the Nigrosine solution, the reactor recharged and re-run as above. This procedure was repeated for 5 additional charges or runs and the results were as follows:

| RUN NO. | REACTION TIME IN HOURS | REACTOR RATING |
|---|---|---|
| VII-1 | 10.0 | 0.4 |
| VII-2 | 10.0 | 0.7 |
| VII-3 | 9.0 | 0.5 |
| VII-4 | 16.0 | 1.0 |
| VII-5 | 10.0 | 1.0 |
| VII-6 | 8.0 | 0.4 |

These results show that the present invention is an answer to the reduction of polymer buildup in emulsion polymerization.

EXAMPLE VIII

In this example a series of 4 runs were made to show the effect of temperature ramping in combination with different catalysts and emulsifier systems. In the first run, designated VIII-1, the recipe employed was as follows:

| INGREDIENT | PARTS |
|---|---|
| Vinyl chloride | 100 |
| Water (demineralized) | 140 |
| Sodium lauryl sulfate | 0.9 |
| $C_{18}$-straight chain alcohol | 2.1 |
| Tert-butyl peroxypivolate | 0.07 |

The above ingredients were premixed and homogenized, as described in Example I, and pumped into an evacuated 15 gal stainless steel polymerization reactor equipped with a heating and cooling jacket and an agitator. Two stainless steel plaques, the same size as that described in Example III, were immersed in the polymerization medium, one plaque, serving as a control was clean but untreated. The second plaque was coated with a 0.5% solution of self-condensed m-phenylenediamine in methanol. The temperature was raised to 45° C. and held there until the pressure decreased to 60 psi. which required a reaction time of 18 hours. The reactor was drained and opened and the polymer buildup was removed and weighed. The plaques were removed, dried and weighed to determine the amount of polymer buildup deposited on them. The second run, designated VIII-2, was made in the same manner except that 0.08 part of bis(4-tert-butyl cyclohexyl)peroxydicarbonate was used in place of tert-butyl peroxypivolate and 0.004 part of sodium nitrite was added to the recipe. Further, the temperature was ramped or programmed as described in Example VI, run number VI-2. The third run, designated VIII-3, was the same as VIII-1 except that the sodium lauryl sulfate was replaced by an equal amount of Polystep ® A-18, which is a sodium α-olefin sulfonate made and sold by the Stepan Chemical Company. The fourth run, designated VIII-4, was the same as VIII-3 except that 0.08 part of bis(4-tert-butyl cyclohexyl)peroxydicarbonate was used in place of tert-butyl peroxypivolate and 0.004 part of sodium nitrite was added to the recipe. In addition, the temperature was programmed in the same way as in run VIII-2. The results are set forth in the following table in which the catalysts and emulsifiers are identified by code, as described in the footnotes:

| RUN NO. | CATALYST | EMULSIFIER SYSTEM | TEMP °C. | REACTION TIME-HOURS | REACTOR BUILDUP | CONTROL PLAQUE | COATED PLAQUE |
|---|---|---|---|---|---|---|---|
| VIII-1 | LUPERSOL-11[1] | SLS(2)-$C_{18}$ Alcohol | 45° C. | 18 | 520 grams | 4.93 grams | 4.18 grams |
| VIII-2 | PERCADOX-16[3] $NaNO_2$ | SLS-$C_{18}$Alcohol | RAMPED 40° C.- 45° C.- 50° C. | 12 | 58 grams | 0.29 gram | 0.16 gram |
| VIII-3 | LUPERSOL-11 | Polystep A-18 $C_{18}$ Alcohol | 45° C. | 15 | 236 grams | 0.081 gram | 0.037 gram |
| VIII-4 | PERCADOX-16 $NaNO_2$ | Polystep A-18 $C_{18}$ Alcohol | Ramped 40° C.- 45° C.- 50° C. | 12 | 81 grams | 0.119 gram | 0.026 gram |

[1]Tert-butyl peroxypivolate
[2]Sodium lauryl sulfate
[3]Bis(4-tert-butyl cyclohexyl) peroxydicarbonate The above results show the improved results obtained in polymer buildup when the various facets of the instant invention are combined.

As can be seen from the above description and examples new and improved vinyl dispersion resins, over those heretofore known in the art can be produced using the process of the present invention. This is possible by the particular combination of the various factors described and claimed herein which is not apparent from the prior art but rather is unexpected. Further, the superior vinyl dispersion resins are made with the present invention with little or no undesirable polymer buildup in the polymerization reactor. Another advantage of the instant invention is the fast reaction, that is, providing a process which is complete in a shorter length of time than heretofore with better quality product thereby increasing production per unit of time. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

We claim:

1. A process for producing homopolymers of vinyl and vinylidene halides and copolymers thereof either with each other or with up to 80% by weight of one or more vinylidene monomers having at least one terminal $CH_2=C<$ grouping comprising, forming a monomer premix containing the monomer or monomers to be polymerized, the aqueous reaction medium, from about 0.02% to about 0.20% by weight of a free-radical yielding catalyst based on the weight of 100 parts of monomer or monomers being polymerized, from about 0.0005% to about 0.02% by weight, based on the weight of the monomer(s), of an activator for said catalyst, from about 0.5% to about 4.0% by weight, based on the weight of the monomer(s) of at least one emulsifier selected from the group consisting of ammonium salts of a saturated fatty acid, alkali metal salts of a saturated fatty acid, said fatty acid containing from 8 to 20 carbon atoms, and a sulfate or sulfonate type soap having the general formula $$CH^3(C_nH_{2n})-X$$

wherein n is an integer from 7 to 18, X is selected from the group consisting of $$-CH=CH-CH_2-Y,$$
$$-\underset{R}{CH}-CH_2-\underset{R'}{CH}-Y, \text{ and}$$

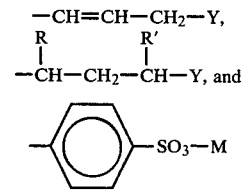

and wherein R is selected from the group consisting of —H, —OH, and an alkyl group having from 1 to 4 carbon atoms, R' is selected from the group consisting of —H, and an alkyl group having from 1 to 4 carbon atoms, and Y is selected from the group consisting of $-SO_3-M$, $-O-SO_3-M$, and $-O-CH_2CH_2-O)_m-SO_3-M$, wherein M is selected from the group consisting of $NH_3$, Na and K, and m is an integer from 7 to 17, at least one long straight chain saturated alcohol containing from 12 to 24 carbon atoms, wherein the ratio of alcohol to emulsifier is 1.0 or greater than 1.0, homogenizing said premix at a temperature below the reactivity of the catalyst or catalysts employed, passing said homogenized premix to a reaction vessel having a coating on the inner surfaces thereof comprised of a water phase polymerization inhibitor, emulsion polymerizing said homogenized premix in a first stage at a temperature in the range of about 30° C. to about 50° C. to a conversion in the range of about 25% to about 30%, thereafter polymerizing said premix in a second stage at a temperature in the range of about 35° C. to about 60° C., then polymerizing said premix in a third stage at a temperature in the range of about 40° C. to about 70° C., wherein the temperature in each of said stages is different and chosen so as to maintain a substantially constant reaction rate, maintaining the pH of the reaction mixture in said stages in the range of about 9.0 to about 11.0 until the reaction is complete, the total time to complete reaction in said first stage through said third stage being in the range of about 6 hours to about 14 hours, and thereafter recovering the homopolymer or copolymer, whereby polymer buildup in said reaction vessel is substantially reduced.

2. A process as defined in claim 1 wherein the monomer in the premix is vinyl chloride.

3. A process as defined in claim 1 wherein the catalyst is bis(4-tert butyl cyclohexyl)peroxydicarbonate.

4. A process as defined in claim 1 wherein the catalyst is di-lauroyl peroxide.

5. A process as defined in claim 1 wherein the catalyst has a water solubility of less than about 500 mg./liter.

6. A process as defined in claim 1 wherein the ammonium salt of a saturated fatty acid is ammonium laurate.

7. A process as defined in claim 1 wherein the activator is sodium nitrite.

8. A process as defined in claim 1 wherein the activator is sodium borohydride.

9. A process as defined in claim 1 wherein the saturated alcohol is a mixture of $C_{12}$ and $C_{18}$ alcohols.

10. A process as defined in claim 1 wherein the premix is homogenized at a temperature of 25° C.

11. A process as defined in claim 1 wherein the coating is self-condensed m-phenylenediamine.

12. A process as defined in claim 1 wherein the coating is self-condensed resorcinol.

13. A process as defined in claim 1 wherein the coating is the condensation product of resorcinol and m-phenylenediamine.

14. A process as defined in claim 1 wherein the temperature in the first stage is 45° C., in the second stage 50° C. and in the third stage 55° C.

15. A process as defined in claim 14 wherein the monomer is vinyl chloride.

16. A process as defined in claim 15 wherein the catalyst is bis(4-tert butyl cyclohexyl)peroxydicarbonate.

17. A process as defined in claim 16 wherein the activator is sodium nitrite.

18. A process as defined in claim 17 wherein the ammonium salt is ammonium laurate and wherein the saturated alcohol is a mixture of $C_{12}$ and $C_{18}$ alcohols.

19. A process as defined in claim 18 wherein the coating is self-condensed m-phenylenediamine.

20. A process as defined in claim 14 wherein the monomer is vinyl chloride and the catalyst is dilauroyl peroxide.

21. A process as defined in claim 1 wherein the emulsifier is sodium lauryl sulfate.

22. A process as defined in claim 1 wherein the emulsifier is sodium alpha-olefin sulfonate.

* * * * *